Jan. 6, 1925.    1,522,087
W. I. TWOMBLY
THERMOSTATIC CONTROL FOR IRONING MACHINES
Filed Oct. 26, 1921    3 Sheets-Sheet 1

Willard I. Twombly INVENTOR
BY
HIS ATTORNEY

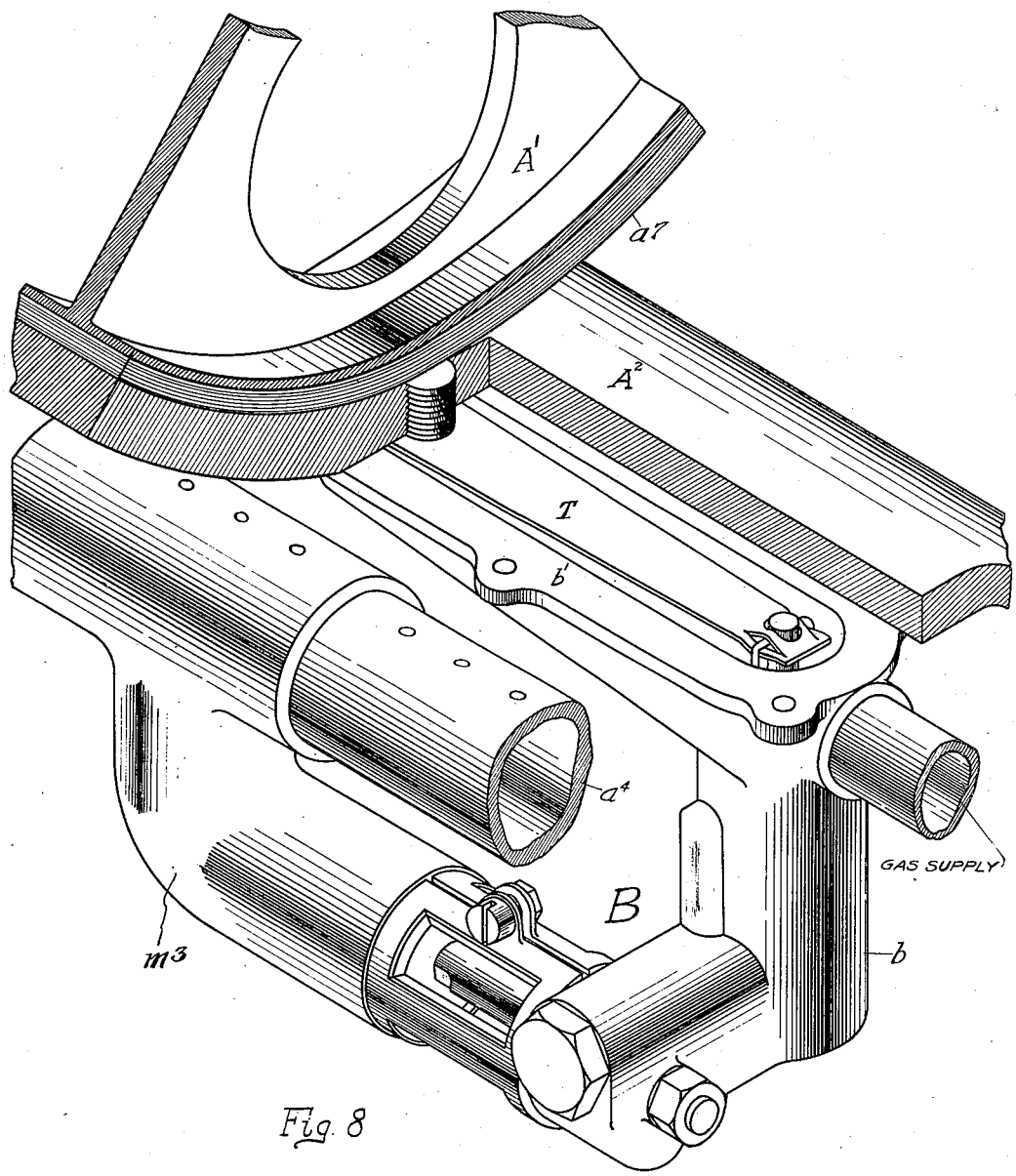

Jan. 6, 1925.

W. I. TWOMBLY 1,522,087

THERMOSTATIC CONTROL FOR IRONING MACHINES

Filed Oct. 26, 1921  3 Sheets-Sheet 3

Willard I. Twombly INVENTOR

BY Geo. E. Brewer

His ATTORNEY

Patented Jan. 6, 1925.

1,522,087

UNITED STATES PATENT OFFICE.

WILLARD I. TWOMBLY, OF NEW YORK, N. Y., ASSIGNOR TO H. A. WILSON COMPANY, OF NEWARK, NEW JERSEY, A CORPORATION OF NEW JERSEY.

THERMOSTATIC CONTROL FOR IRONING MACHINES.

Application filed October 26, 1921. Serial No. 510,651.

*To all whom it may concern:*

Be it known that I, WILLARD I. TWOMBLY, a citizen of the United States, residing in the borough of Manhattan, city, county, and State of New York, have invented certain new and useful Improvements in Thermostatic Controls for Ironing Machines, of which the following is a specification.

My invention relates to thermostatic controls for ironing machines. I will describe a thermostatic control applied to an ironing machine and embodying my invention and then point out the novel features in claims.

Figure 1:
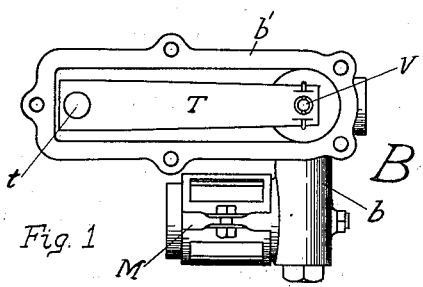
Figure 7:
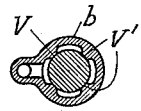
Figure 2:
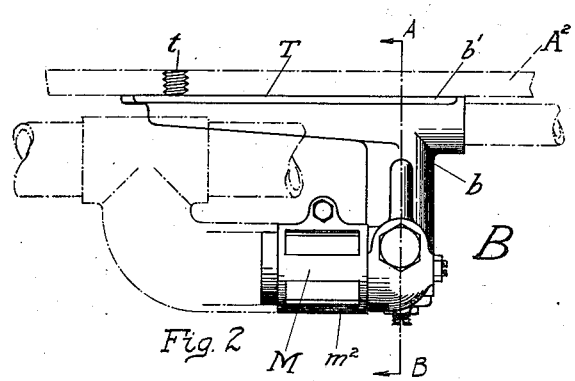
Figure 3:
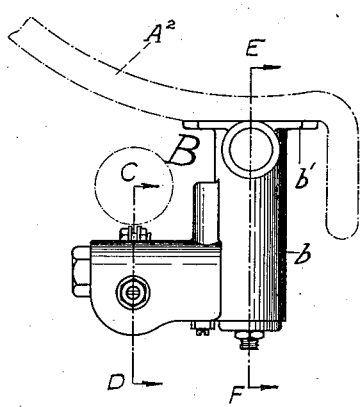
Figure 4:
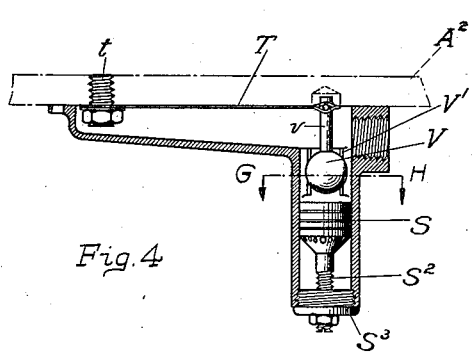
Figure 5:
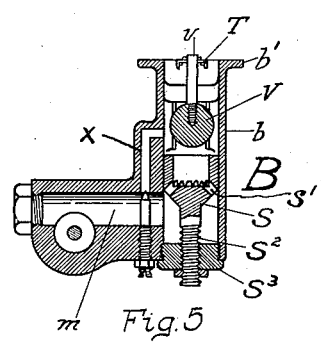
Figure 6:
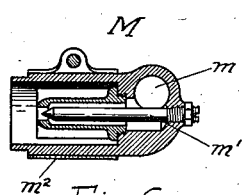
Figure 9:
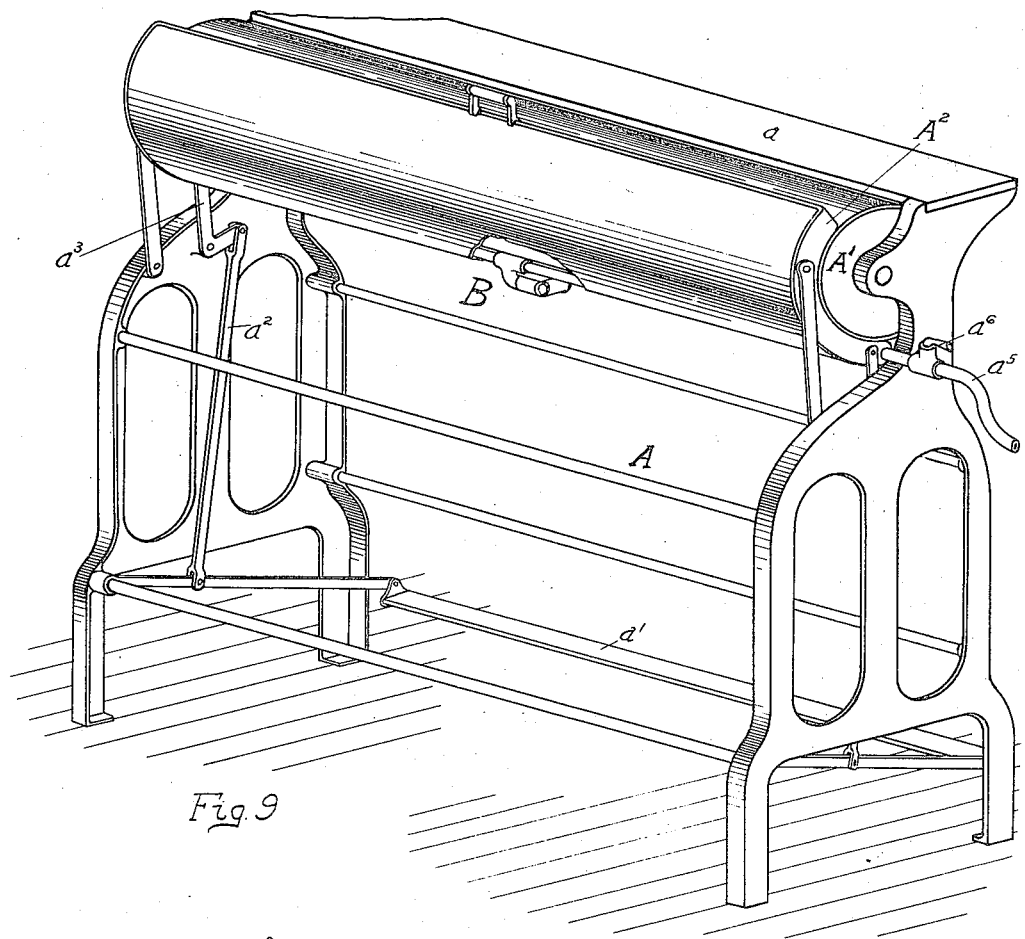
Figure 10:
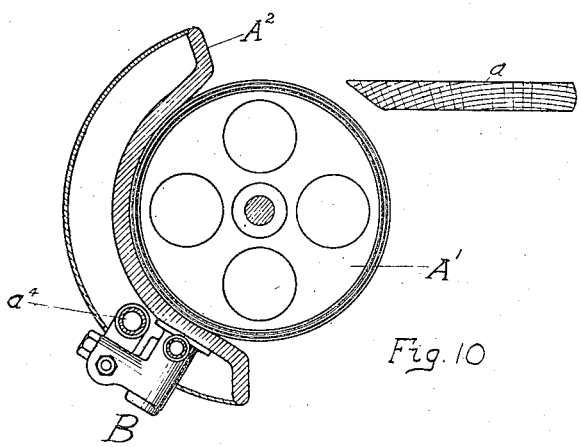

In the accompanying drawings, Fig. 1 is a top view of a thermostatic control embodying my invention. Fig. 2 is a side elevation thereof showing in dotted lines a portion of an ironing machine, and the adjacent pipe connections. Fig. 3 is an end elevation of Fig. 2. Fig. 4 is a cross-sectional view taken on the line E—F of Fig. 3. Fig. 5 is a sectional view taken on the line A—B of Fig. 2. Fig. 6 is a sectional view taken on the line C—D of Fig. 3. Fig. 7 is a sectional view taken on the line G—H of Fig. 4. Fig. 8 is a perspective view of a portion of an ironing machine, having a thermostatic control applied thereto, and embodying my invention. Fig. 9 is a perspective view of an ironing machine, partly broken away and showing the location of the thermostatic control embodying my invention. Fig. 10 is a detail cross-sectional view of the ironing machine of Fig. 9 at the location of the thermostatic control.

Similar letters of reference designate corresponding parts in all of the figures.

Referring more particularly to Figs. 8, 9 and 10, the ironing machine there shown comprises a suitable framework A upon which the usual worktable $a$ is supported, and in which the ironing roller $A^1$ (having the usual covering $a^7$) is journalled in such manner that it can be rotated. The means for rotating it are not shown, and may be any well known in the practical art. $A^2$ designates the ironing shoe, which as usual has a polished surface adjacent the roller $A^1$. Between these members the various articles are ironed. The shoe $A^2$ is pivotally mounted in the framework as usual, and is rocked on its pivots by the treadle $a^1$ and levers $a^2$, $a^3$. In the form of ironing machine, shown in the drawings, the shoe is shown as being provided with the usual gas burner $a^4$, which extends the length of the shoe and which is supplied with fuel, in the form of gas, from a suitable source of supply through the connection $a^5$ which is controlled by a valve $a^6$. Instead the ironing roller may be heated. Included in the piping to the burner and between it and the source of gas supply is a thermostatic control indicated generally by B, which as shown is preferably located midway of the ends of the burner.

The several parts of the thermostatic control B are enclosed in a casing $b$, which is provided with a flange $b^1$, by means of which it is secured directly to a wall of the heated member, and as shown, to the rear surface of the shoe. The thermostat T of the control is secured at one end directly to the wall of the shoe by means of a stud or rivet $t$ of copper or other good heat conducting metal, while its other end supports a valve V. The thermostat T as here shown, is composed of two metals welded together throughout their entire length, and having widely different co-efficients of expansion, as for example, steel and brass. The valve V is provided with a stem $v$, which is suitably connected with the free end of the thermostat. As the thermostat expands under the influence of heat, the valve V moves to its seat S by gravity, and when the thermostat contracts it lifts the valve from the seat. The valve is guided in its movements to and from the seat S by the ribs or projections $v^1$. The valve seat S is provided with a cup portion $s$ on which the valve V seats, and with a plurality of openings $s^1$ at the base thereof through which the gas escapes into a passage $m$ leading to a mixing device (see Fig. 6) generally designated M. The seat is also provided with a screw threaded stem $s^2$ which works in a plug $s^3$ carried by the casing. The seat S may therefore be moved toward and away from the valve, according to what temperature it is desired to maintain for the shoe $A^2$. That is, the thermostat has a certain amount of movement for a certain degree of temperature, and therefore when it has moved the distance for the desired degree of temperature, the valve should be seated to cut off the further supply of gas to the burner except for the minute amount through the by-pass $x$. If desired, a temperature scale and pointer may be provided for the valve seat, in order that the proper position of the valve may be obtained for any desired temperature.

The mixing chamber M, may be of any well known construction, and as here shown it comprises an adjustable needle $m^1$ for controlling the flow of gas, and an adjustable air shutter $m^2$, so that proper mixture may be secured. The gas mixture passes to the burner through the connection $m^3$.

The operation of the device will be obvious. The control B is adjusted to supply the necessary amount of gas to keep the shoe at the required temperature for ironing without scorching or burning. The advantages of the control will be appreciated because of the fact that the ironing machine is called upon to iron all sorts of articles from a handkerchief to a wet blanket or table cloth, etc. It is obvious that the amount of heat extracted from the shoe is vastly different when ironing small work such as napkins and handkerchiefs, than when ironing a wet or damp blanket or table cloth. But with the use of the control the same temperature can be maintained when ironing no matter what the article may be and still avoid burning or scorching.

Claims—

Having thus described my invention, what I claim as new is:

1. A thermostatic control for the shoes of ironing machines and the like, comprising a shoe, a gas burner outside of said shoe for heating the same, a casing adapted to be attached to such shoe, a flexing thermostatic element in said casing adapted to contact with said shoe when said casing is attached, a gas inlet connection and a gas outlet connection for said casing, a valve between said inlet and said outlet and an operative connection between said thermostatic element and said valve.

2. In an ironing machine, the combination of a shoe, a casing attached to such shoe, a gas supply pipe connected with said casing, a thermostatic element adapted to bend under the influence of heat attached to the shoe, a valve in said casing, a connection between the valve and the thermostatic element, a burner substantially the length of the shoe above said thermostatic element and outside of said shoe, and a connection between said burner and said casing.

3. In a device of the kind described, a member to be heated, a gas burner outside of said member adapted to heat the same, a thermostatic element of the flexing type below said burner adjacent the heated side of such member, a casing for said element adapted to protect said element from air currents and to conduct gas from a supply line to the inlet connection for said burner and a valve in said casing controlled by said element.

4. A device as characterized in claim 3, in which the thermostatic element is in metallic contact with the member to be heated.

5. In a device of the kind described, a member to be heated, a gas burner adapted to heat one side of said member, a valve in the supply line for said burner, a thermostatic element in metallic contact with the heated side of said member but out of the zone of the flame generated by said burner and an operative connection between said valve and said element.

WILLARD I. TWOMBLY.

Witnesses.
PEARL H. BERMAN,
BERTHA E. COOK.